(12) United States Patent
Marks

(10) Patent No.: US 10,799,988 B1
(45) Date of Patent: Oct. 13, 2020

(54) PIPE ALIGNMENT TOOL AND METHOD

(71) Applicant: The United States of America, as Represented by the Secretary of the Navy, Arlington, VA (US)

(72) Inventor: Galen Marks, Oxnard, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 124 days.

(21) Appl. No.: 16/225,314

(22) Filed: Dec. 19, 2018

(51) Int. Cl.
| | |
|---|---|
| *B23Q 3/00* | (2006.01) |
| *B23K 37/053* | (2006.01) |
| *B66C 1/12* | (2006.01) |

(52) U.S. Cl.
CPC ............ *B23K 37/053* (2013.01); *B66C 1/125* (2013.01)

(58) Field of Classification Search
CPC .................................... B23Q 3/00; B23Q 3/04
See application file for complete search history.

(56) References Cited

U.S. PATENT DOCUMENTS

| | | | | |
|---|---|---|---|---|
| 4,054,984 A | * | 10/1977 | Ball ......................... | B25B 27/10 29/237 |
| 4,273,371 A | * | 6/1981 | Behnke ..................... | B66C 1/34 24/116 R |
| 4,991,893 A | * | 2/1991 | Gordon .................... | B66F 15/00 254/129 |
| 5,785,146 A | * | 7/1998 | Palmer ............... | A62B 35/0068 182/3 |
| 6,568,712 B1 | | 5/2003 | Aaron, III | |
| 7,293,759 B2 | * | 11/2007 | Beach .................... | B66F 19/005 254/120 |
| 7,887,026 B2 | * | 2/2011 | Lusty ................... | A01G 23/062 254/133 R |
| 7,967,353 B2 | | 6/2011 | Robins | |
| 8,844,917 B2 | * | 9/2014 | Buske ..................... | B63B 73/00 269/143 |
| 9,592,588 B2 | | 3/2017 | Bender | |
| 9,850,049 B2 | | 12/2017 | Gallup et al. | |
| 9,909,696 B2 | | 3/2018 | Gledhill | |

* cited by examiner

*Primary Examiner* — Lee D Wilson
(74) *Attorney, Agent, or Firm* — Naval Air Warfare Center Weapons Division; Jimmy M. Sauz

(57) ABSTRACT

A pipe alignment tool may be used to hoist and align two pipe ends and may comprise: a chain and an alignment bar. The alignment bar may comprise: an elongate bar with a pipe contacting member and a chain support slidably coupled to the elongate bar for guiding and retaining the chain. The method for aligning two pipe ends may comprise the steps of: providing the pipe alignment tool; lassoing the chain around a first pipe; guiding and securing the chain to the chain support of the pipe alignment tool; hoisting the chain and first pipe by lifting the alignment bar; and aligning the two pipe ends by repositioning the elongate bar and engaging an upper portion of the second pipe with the pipe contacting member.

20 Claims, 4 Drawing Sheets

PIPE ALIGNMENT TOOL AND METHOD

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to pipe aligning tools, and more specifically, to devices and methods for hoisting and aligning open ends of two pipes.

SUMMARY OF ILLUSTRATIVE EMBODIMENTS

To minimize the limitations in the related art and other limitations that will become apparent upon reading and understanding the present specification, the following discloses a new and useful pipe alignment tool and method.

One embodiment may be a pipe alignment tool, comprising: (1) a chain having a plurality of chain links interconnected in series and a ring coupled to a first end of the chain, the ring having an opening sized to allow a second end of the chain and the plurality of chain links to pass through; and (2) an alignment bar, comprising: (i) a chain support adapted to guide and retain the chain, the chain support comprising: (a) a grab hook portion having a receiving slot with an open side; (b) a guide ring segment closing the open side of the grab hook portion; and (c) a sleeve portion combined with the grab hook portion and the guide ring segment; and (ii) an elongate bar extending about a longitudinal axis and having forwardly and rearwardly-extending free end portions, the forwardly-extending free end portion being curved downwards and comprising a pipe contacting member, wherein the elongate bar may be slidably disposed within a cavity of the sleeve portion. The chain may be adapted to lasso around a pipe having a bore diameter between approximately 4 to 16 inches by wrapping the plurality of chain links around the pipe and passing the second end of the plurality of chain links through the ring of the chain. The elongate bar may further comprise a protrusion disposed between the rearwardly-extending free end portion and the chain support, the protrusion being adapted to block the chain support from contacting the rearwardly-extending free end portion of the elongate bar. The pipe contacting member of the elongate bar may comprise two arm portions and may be substantially v-shaped. An end portion of the rearwardly-extending free end portion of the elongate bar may be tilted at an angle upwards and away from the longitudinal axis.

Another embodiment may be a pipe alignment tool, consisting essentially of: (1) a chain having a plurality of chain links interconnected in series and a ring coupled to a first end of the chain, the ring having an opening sized to allow a second end of the chain and the plurality of chain links to pass through; and (2) an alignment bar, consisting essentially of: (i) a chain support adapted to guide and retain the chain, the chain support consisting essentially of: (a) a grab hook portion having a receiving slot with an open side; (b) a guide ring segment closing the open side of the grab hook portion; and (c) a sleeve portion combined with the grab hook portion and the guide ring segment; and (ii) an elongate bar extending about a longitudinal axis and having forwardly and rearwardly-extending free end portions, the forwardly-extending free end portion being curved downwards and having a pipe contacting member, and wherein the elongate bar may be slidably disposed within a cavity of the sleeve portion. The pipe contacting member of the elongate bar may consist two arm portions and may be substantially v-shaped. An end portion of the rearwardly-extending free end portion of the elongate bar may be tilted at an angle upwards and away from the longitudinal axis.

Another embodiment may be a method for aligning two pipe ends, the method comprising the steps of: providing a pipe alignment tool, comprising: (1) a chain having a plurality of chain links interconnected in series and a ring coupled to a first end of the chain, the ring having an opening sized to allow a second end of the chain and the plurality of chain links to pass through; and (2) an alignment bar, comprising: (i) a chain support adapted to guide and retain the chain, the chain support comprising a combination of: (a) a grab hook portion, (b) a guide ring segment, and (c) a sleeve portion; and (ii) an elongate bar extending about a longitudinal axis and slidably disposed within a cavity of the sleeve portion of the chain support; wherein the elongate bar may comprise: a forwardly-extending free end portion, a rearwardly-extending free end portion, and a protrusion disposed between the rearwardly-extending free end portion and the chain support, the forwardly-extending free end portion being curved downwards and comprising a pipe contacting member; lassoing the chain around a first pipe by wrapping the chain around the first pipe and passing the second end of the chain and at least some of the plurality of chain links through the ring, such that the chain may noose the first pipe; engaging and securing the chain to the chain support of the pipe alignment tool by at least feeding the second end of the chain through the guide ring segment of the chain support and sliding one of the plurality of chain links through the receiving slot of the grab hook portion; hoisting the chain and the first pipe with the pipe alignment tool by lifting the alignment bar; and aligning a first pipe end of the first pipe with a second pipe end by repositioning the alignment bar and engaging the pipe contacting member with an upper portion of the second pipe. The method may further comprise the step of: applying an upward force beneath the rearwardly-extending free end portion of the elongate bar, such that the chain support serves as a fulcrum for leverage, the upward force causing the first and second pipe ends to become end-to-end abutting relation. The first and second pipes may have bore diameters between approximately 4 to 16 inches. The method may further comprise the steps of: providing a lifting apparatus; repositioning the lifting apparatus beneath the first pipe or the second pipe; and lifting the first pipe or the second pipe with the lifting apparatus. The lifting mechanism may be a scissor-jack. The pipe contacting member of the elongate bar may comprise two arm portions and may be substantially v-shaped. An end portion of the rearwardly-extending free end portion of the elongate bar may be tilted at an angle upwards and away from the longitudinal axis.

Another embodiment may be a method for aligning and joining two pipe ends, the method comprising the steps of: providing a pipe alignment tool, comprising: (1) a chain having a plurality of chain links interconnected in series and a ring coupled to a first end of the chain, the ring having an opening sized to allow a second end of the chain and the plurality of chain links to pass through; and (2) an alignment bar, comprising: (i) a chain support adapted to guide and retain the chain, the chain support comprising: (a) a grab hook portion having a receiving slot sized to substantially fit a thickness of at least one of the plurality of chain links, wherein the receiving slot has an open side; (b) a guide ring segment closing the open side of the grab hook portion; and (c) a sleeve portion combined with the grab hook portion and the guide ring segment; and (ii) an elongate bar extending about a longitudinal axis in length between approximately 30 to 55 inches and slidably disposed within a cavity of the sleeve portion; wherein the elongate bar may comprise: a forwardly-extending free end portion, a rearwardly-extending free end portion, and a protrusion disposed between the rearwardly-extending free end portion and the chain support, the forwardly-extending free end portion being curved downwards and comprising a pipe contacting member; lassoing the chain around a first pipe by wrapping the chain around the first pipe and passing the second end of the chain and at least some of the plurality of chain links through the ring, such that the chain nooses the first pipe; engaging and securing the chain to the chain support of the pipe alignment tool by passing at least the second end of the chain through the guide ring segment of the chain support and sliding one of the plurality of chain links through the receiving slot of the grab hook portion; hoisting the chain and the first pipe with the pipe alignment tool by lifting the alignment bar; aligning a first pipe end with a second pipe end by repositioning the alignment bar and engaging the pipe contacting member with an upper portion of the second pipe; and wherein the first and second pipe ends may have bore diameters between approximately 4 to 16 inches. The method may further comprise the step of: applying an upward force beneath the rearwardly-extending free end portion of the elongate bar, such that the chain support serves as a fulcrum for leverage, the upward force causing the first and second pipe ends to become end-to-end abutting relation. The method may further comprise the steps of: providing a lifting apparatus; repositioning the lifting apparatus beneath the first pipe or the second pipe; and lifting the first pipe or the second pipe with the lifting apparatus. The lifting mechanism may be a scissor-jack. The method may further comprise the step of: joining the first and second pipes by installing a grooved clamp around the first pipe end and the second pipe end. The method may further comprise the step of: joining the first and second pipes by installing a pipe fitting between the first pipe end and the second pipe end. The pipe contacting member of the elongate bar may consist two arm portions and may be substantially v-shaped. An end portion of the rearwardly-extending free end portion of the elongate bar may be tilted at an angle upwards and away from the longitudinal axis.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

DETAILED DESCRIPTION OF ILLUSTRATIVE EMBODIMENTS

Figure 1:
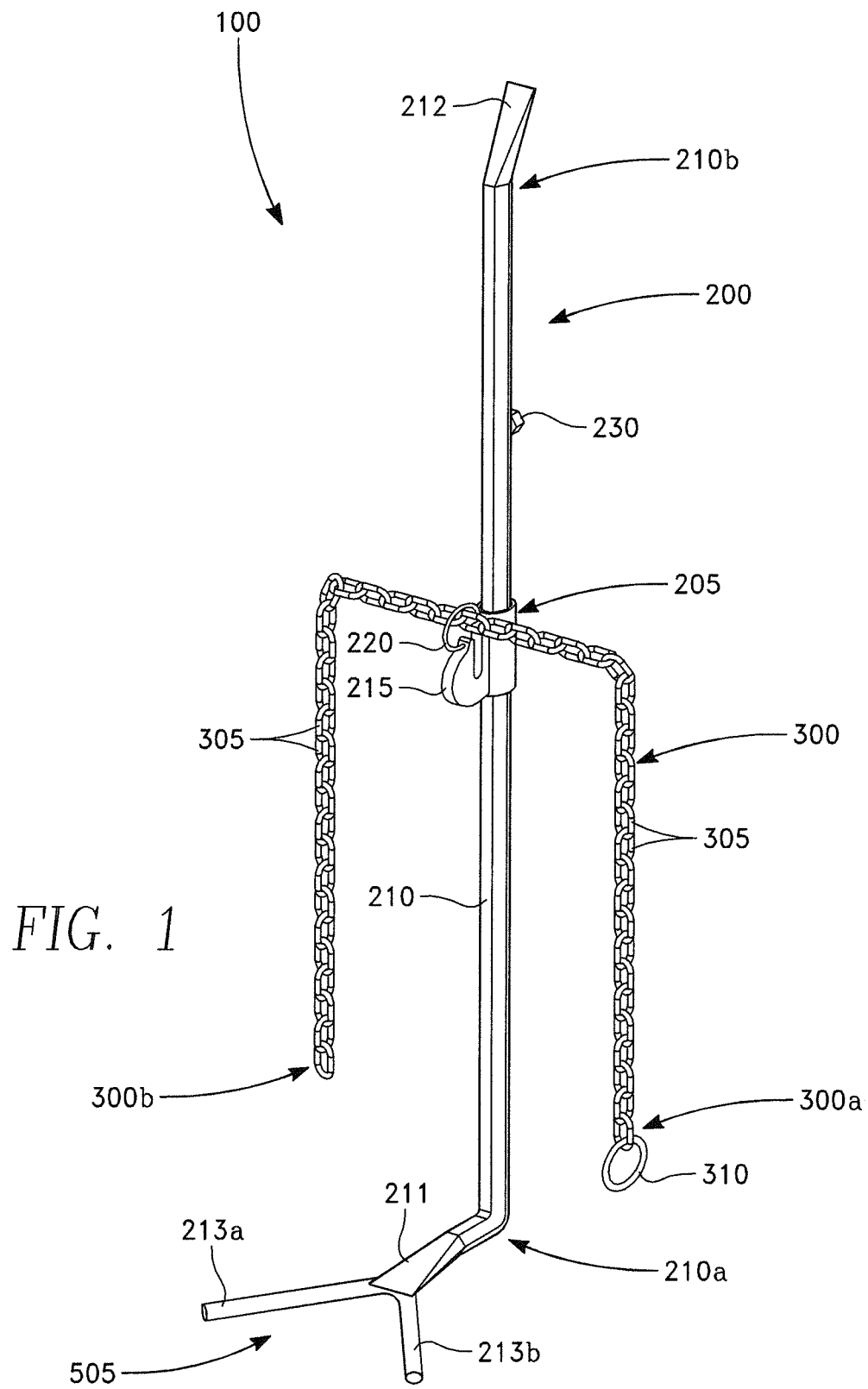
FIG. 1 is an illustration of a pipe alignment tool, according to some embodiments of the present disclosure.

In the following detailed description, numerous specific details are set forth in order to provide a thorough understanding of various aspects of one or more embodiments of the pipe alignment tool and method. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the pipe alignment tool and method. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc. . . . In other instances, well-known structures, materials, or operations are generally not shown or described in detail to avoid obscuring aspects of the disclosure.

Definitions

In the following description, certain terminology is used to describe certain features of the embodiments of the pipe alignment tool and method. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" generally refers to the actual value being within a range of 10% of the indicated value. The meaning of other terminology used herein should be easily understood by someone of reasonable skill in the art. For example, a pipe having a bore diameter measured between approximately 4 to 16 inches may refer to pipe having a bore diameter between 4.4 to 17.6 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein, the singular forms "a" and "the" may include plural referents, unless the context clearly dictates otherwise. Thus, for example, reference to a "protrusion" can include reference to one or more protrusions.

In general, pipe fitting requires guiding a pair of pipe sections into alignment so that the flanges, clamps, or welds at the pipe ends may be joined and secured together. Pipe fitting, however, may be difficult, especially when aligning and coupling large pipes with precision. For example, a particular pipe may be difficult to reach or may require assistance when determining a leveling point in a space therefrom. This may often require a worker to assist in the coupling of two pipe sections by manually guiding the pipe sections together so that they are properly aligned and possibly joined in a near abutting relationship.

Accordingly, the embodiments of the pipe alignment tool and method disclosed herein solve these problems by providing a tooling device that aids in pipe alignment and facilitates ease of installation. This capability is especially important when repairing in ground and above grade piping in an expeditious manner.

Although embodiments of the present disclosure are described in considerable detail, including references to certain versions thereof, other versions are possible such as, for example, orienting and/or attaching components in a different fashion. Therefore, the spirit and scope of the appended claims should not be limited to the description of versions included herein.

In the accompanying drawings, like reference numbers indicate like elements. Reference character 100 generally refers to a pipe alignment tool, according to some embodiments of the present disclosure. Other variations, of course, are possible without deviating from the merits or generalities of the embodiments disclosed herein.

FIG. 1 is an illustration of a pipe alignment tool, according to some embodiments of the present disclosure. The pipe alignment tool 100 may be an instrument that assists in the alignment of two pipe ends in order to facilitate ease of installation in an expeditious manner. As shown in FIG. 1, one embodiment of a pipe alignment tool 100 may comprise: an alignment bar 200 and a chain 300, wherein the alignment bar 200 may comprise: a chain support 205 and an elongate bar 210. The chain 300 may be a series of interconnected chain links 305 used for fastening or securing objects and pulling or supporting loads. The chain links 305 may be metal links or rings and are typically standard, high-strength chains commonly used in hoisting applications. The chain 300 may also comprise a ring 310 disposed at a first end 300*a* of the chain 300. The ring 310 may have an opening 310*a* (shown in FIG. 3) sized to allow the chain links 305 and second end 300*b* of the chain 300 to pass through, such that the chain 300 may be adapted to lasso 500 (shown in FIG. 5) around an object such as a pipe. This may be accomplished by wrapping a pipe section with the chain 300 and passing the second end 300*b* of the chain 300 and some chain links 305 through the ring 310 in order to noose the pipe section.

The alignment bar 200 may be a thin, straight bar used for hoisting the chain 300 and object being lassoed (e.g., pipe). The alignment bar 200 may be constructed of hard material such as metal and may comprise: a chain support 205 and an elongate bar 210. The chain support 205 may be configured to guide and hold the chain 300 with the elongate bar 210 and may be slidably coupled to the elongate bar 210. This may allow the chain support 205, chain 300, and lassoed object to slide freely along portions of the elongate bar 210. Additional details of the alignment bar 200 and chain 300 are described in more detail in FIGS. 2 and 3 respectively below.

In operation, the chain 300 may be used to lasso a first pipe by wrapping the chain 300 around a pipe section of the first pipe. Once wrapped, the chain 300 and first pipe are preferably lifted and held by the alignment bar 200 via the chain support 205. The position of the first pipe can then be manipulated and aligned to a second pipe via the alignment bar 200 so that a pipe coupling (e.g., clamp, pipe fitting) can be installed or secured. In some embodiments, the elongate bar 210 may comprise a pipe contacting member 505 coupled or attached to the front end 211 of the elongate bar 210. The pipe contacting member 505 may be configured to engage, cradle, and/or steadily hold the second pipe during alignment. In other embodiments, a lifting mechanism such as a scissor jack may also be used to help hold a pipe in its relative position.

Figure 2:
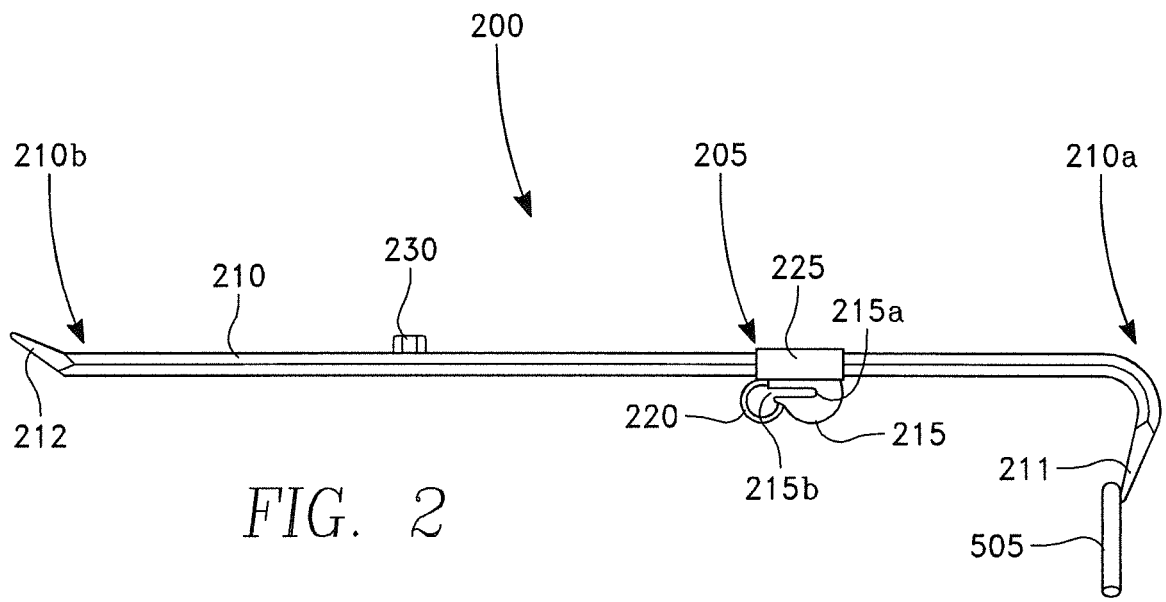
FIG. 2 is an illustration of an alignment bar, according to some embodiments of the present disclosure.

FIG. 2 is an illustration of an alignment bar, according to some embodiments of the present disclosure. As shown in FIG. 2, one embodiment of the alignment bar 200 may comprise: a chain support 205 and an elongate bar 210. The chain support 205 is preferably a chain holder adapted to guide, hold, and secure/retain the chain 300, preferably when an object such as a pipe is lassoed by the chain 300. In an exemplary embodiment, the chain support 205 may comprise a grab hook portion 215, a guide ring segment 220, and a sleeve portion 225.

The grab hook portion 215 may have a receiving slot 215*a* with an open side 215*b*, and the receiving slot 215*a* is preferably used to retain a portion of the chain 300. In a preferred embodiment, the receiving slot 215*a* may be dimensioned to snugly fit the thickness of a chain link 305, such that adjacent chain links 305 may be in contact and held by the grab hook portion 215. In this manner, the alignment bar 200 may be used to hold and retain the chain 300 when the chain 300 lassos an object such as a pipe.

The guide ring segment 220, which can be formed as part of the grab hook portion 215 or attached thereto, may close the open side 215*b* of the grab hook portion 215. The guide ring segment 220 may also comprise an opening, which may be substantially circular and sufficiently large to allow free movement of the chain 300. This may ensure that the adjacent chain links 305 are properly aligned to one another for passage into the receiving slot 215a of the grab hook portion 215. The sleeve portion 225 may be combined with the grab hook portion 215 and/or the guide ring segment 220 and is preferably used to slidably couple to the elongate bar 210. In this manner, the chain support 205 may move freely along the length of the elongate bar 210. In other embodiments, movement of the chain support 205 may be restricted to only certain areas along the length of the elongate bar 210.

As discussed above, the elongate bar 210 is preferably a long rod or rigid piece of metal or similar material extending about a longitudinal axis and is preferably used for hoisting the chain 300 and lassoed object via the chain support 205. The elongate bar 210 may have a forwardly extending free end portion 210a, rearwardly-extending free end portion 210b, and protrusion 230. In various embodiments, the forwardly-extending free end portion 210a may comprise a pipe contact member 50, which may be used for steady handling or cradling of a pipe during alignment. The pipe contact member 50 may also comprise two arm portions 213a, 213b and may be substantially v-shaped, as shown in FIG. 1. The protrusion 230 may be located somewhat near the rearwardly-extending free end portion 210b of the elongate bar 210 and may be used to preclude slidable movement of the chain support 205 towards the rear end of the elongate bar 210. The rearwardly-extending free end portion 210b may have an end portion 212 that is angled or tilted upwards and away from the longitudinal axis of the elongate bar 210. In this manner, a user may provide clearance to the forward end of the alignment bar 200 by applying a downward force to the tilted end portion 210a, thereby raising the forwardly-extending free end portion 210a and pipe contact member 50 away from a pipe or object.

Importantly, the elongate bar 210 may be slidably disposed within a cavity of the sleeve portion 225 of the chain support 205. This may allow the chain support 205 to move or slide freely along the length of the elongate bar 210 between the pipe contact member 211 and protrusion 230. In this manner, the chain 300 and lassoed object may be repositioned at a certain location along the length of the elongate bar 210.

In one embodiment, the elongate bar may extend between approximately 30 to 55 inches. In a preferred embodiment, the elongate bar may be approximately 48 inches.

Figure 3:
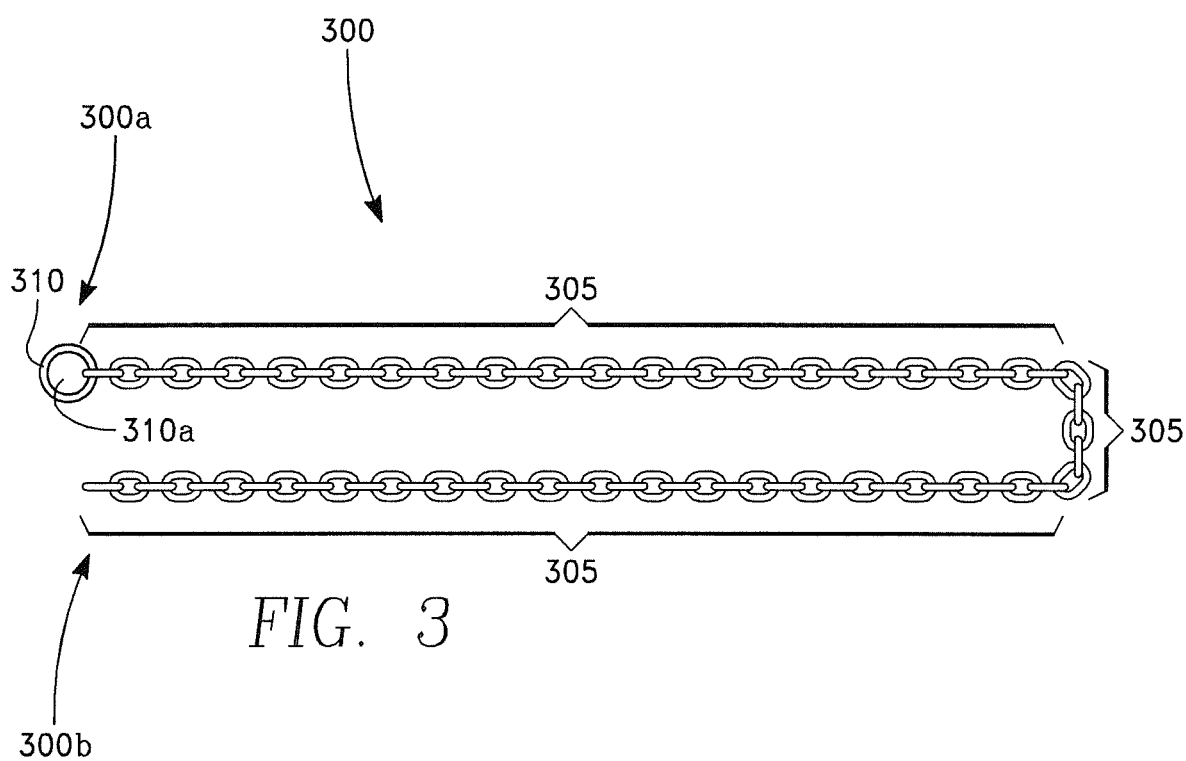
FIG. 3 is an illustration of a chain, according to various embodiments of the present disclosure.

FIG. 3 is an illustration of a chain, according to various embodiments of the present disclosure. As shown in FIG. 3, one embodiment of the chain 300 may comprise chain links 305 and a ring 310. As discussed above, each chain link 305 may be a metal link or ring interconnected to another in series in an end-to-end relationship. The length of each chain link 305 may also be greater than its width.

FIG. 3 shows that the chain 300 may comprise a ring 310 attached to one end of the chain 300. The ring 310 may be substantially circular for holding or guiding the other end of the chain 300 and preferably has an opening 310a that is larger than each of the chain links 305. In this manner, the second end 300b of the chain 300 may be inserted and fed through the opening 310a of the ring 310, such that the chain 300 may form a lasso for holding and noosing a pipe section.

In various embodiments, the chain 300 may extend between approximately 20 to 90 inches. In an exemplary embodiment, the chain 300 may be approximately 75 inches. Additionally, embodiments of the ring 310 may have an opening 310a with a diameter measuring between approximately 1 to 4 inches. In a preferred embodiment, the ring may have a diameter of approximately 3 inches.

Figure 4:
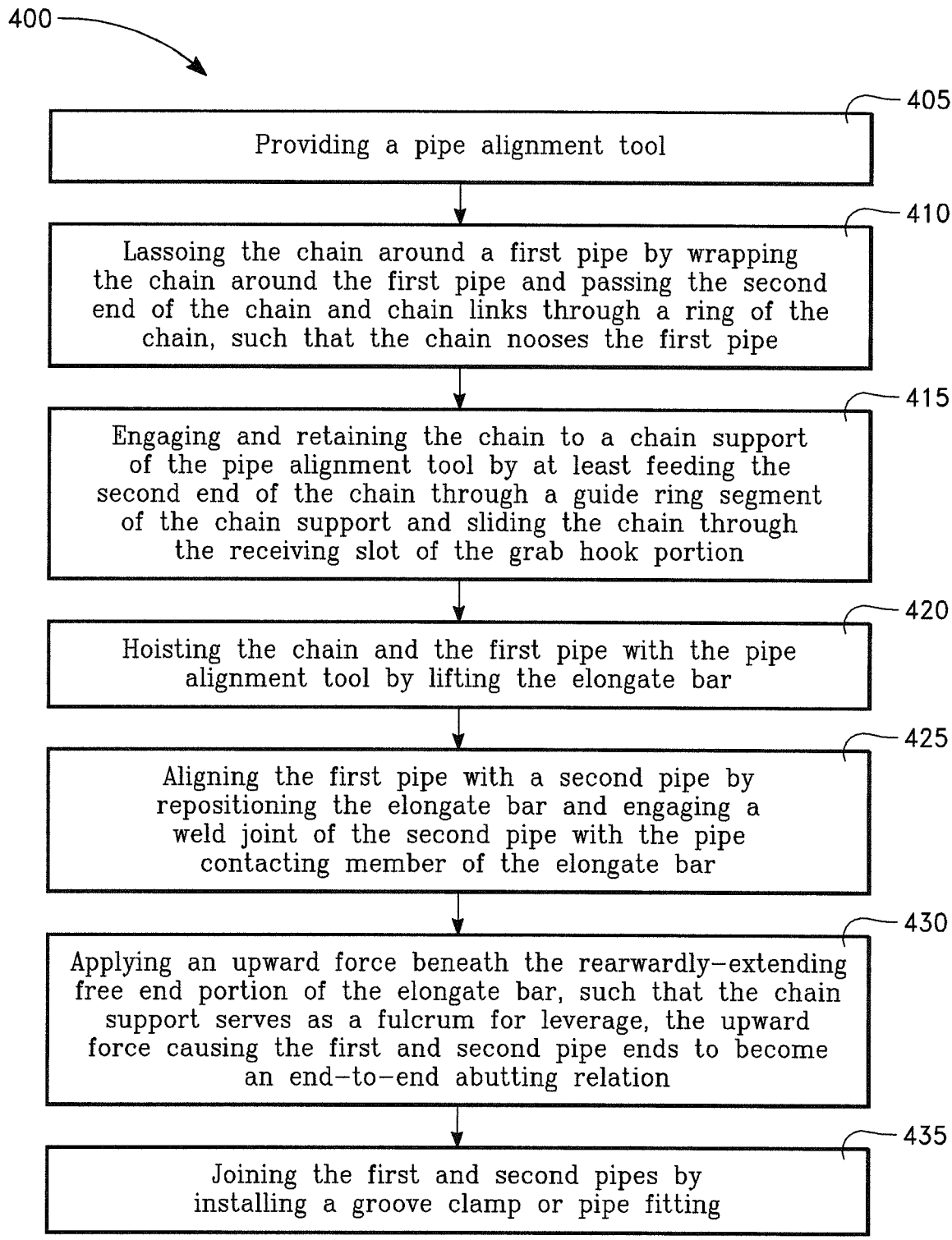
FIG. 4 is a flow chart of one embodiment of a method for aligning two pipe ends using the pipe alignment tool.

FIG. 4 is a flow chart of one embodiment of a method for aligning and joining two pipe ends using the pipe alignment tool. As shown in FIG. 4, one embodiment of the method 400 may comprise steps: 405, 410, 415, 420, 425, 430, 435. Specifically, the method 400 may comprise the first step 405 of providing a pipe alignment tool 100. As discussed above, the pipe alignment tool 100 may be a tool or instrument used to align two pipe ends and may comprise an alignment bar 200 and chain 300. The chain 300 may comprise multiple chain links 305 interconnected in series and a ring 310 disposed on a first end 300a of the chain 300. The ring 310 may also have an opening 310a sized to allow the second end 300b of the chain 300 to pass through. In this manner, the chain 300 may be used to lasso around a pipe section in order to noose that pipe.

The pipe alignment tool 100 may also comprise an alignment bar 200 having a chain support 205 and an elongate bar 210. As discussed above, the chain support 205 may be adapted to guide, hold, and secure the chain 300 and may comprise: a grab hook portion 215 having a receiving slot 215a with an open side 215b; a guide ring segment 220 closing that open side 215b of the grab hook portion 215; and a sleeve portion 225. The elongate bar 210 may also have a forwardly and rearwardly-extending free end portions, and a protrusion 230. The forwardly-extending free end portion 210a may be curved and may comprise a pipe contacting member 211. The elongate bar 210 may be slidably disposed within a cavity of the sleeve portion 225 to allow the chain support 205 to slide along the elongate bar 210.

FIG. 4 also shows the next step 410, which may be lassoing the chain 300 around the first pipe. Here, the chain 300 may form a lasso around the first pipe by wrapping the chain 300 around a section of the first pipe and feeding the second end 300b of the chain 300 and some chain links 305 through the ring 310. As the second end 300b of the chain 300 is fed through the ring 310, the chain 300 may serve as a noose in order to hold and secure the first pipe. Thus, the pipe may removeably secured by the chain 300 for hoisting and lifting.

Turning to steps 415 and 420, the method 400 may also include the steps of engaging and retaining the chain 300 to the chain support 205 of the pipe alignment tool 100. Here, after lassoing and noosing the chain 300, the second end 300b of the chain 300 is preferably fed through the guide ring segment 220 of the chain support 205. After being fed, the chain 300 is also preferably inserted into the receiving slot 215a of the grab hook portion 215 in order for the chain 300 and pipe to be securely held by the chain support 205. In this manner, a user may then perform step 420 by hoisting the chain 300 and the first pipe with the pipe alignment tool 100, simply by lifting the elongate bar 210.

FIG. 4 also shows that the method 400 may comprise the step 425 of aligning the first pipe with the second pipe. Here, the user may reposition the first pipe with the pipe alignment tool 100 in order to align the first pipe end with a second pipe end. This may be accomplished by engaging the second pipe (shown in FIG. 6) with the pipe contacting member 505 of said elongate bar 210. Preferably, the pipe contacting member 505 may contact an upper portion of the second pipe. To help facilitate the pipe alignment, a lifting apparatus such as a scissor-jack may also be used in conjunction by positioning the lifting apparatus beneath the first pipe or second pipe and lifting the first pipe or second pipe with the lifting apparatus.

After the first and second pipes are aligned, step 430 may be performed. Here, once the pipe contacting member 505 of the pipe alignment tool 100 contacts the second pipe, the user may apply an upward force beneath the rearwardly-extending free end portion 210b of the elongate bar 210. In this manner, the chain support 205 may serve as a fulcrum for leverage, causing the first and second pipe ends to move substantially closer together in an end-to-end abutting relation.

Finally, FIG. 4 shows the final step 435, which may be joining the first and second pipes. Here, after the first and second pipe ends are aligned in near proximity, the first and second pipes may be joined by installing a pipe coupling such as a groove or non-grooved clamp, weld joint, or pipe fitting. Specifically, a groove clamp may be installed by utilizing clamp heads suited to the same diameter piping. One head may be fixed on the pipe via tightening of the clamp while the other head may slide onto the second pipe and lock when clamping pressure is applied. Examples of such groove clamps used with the pipe alignment tool 100 may include high pressure and low pressure grooved clamps.

On the other hand, a pipe fitting may be optionally used to join the first and second pipes. Here, the pipe fitting may be a mechanical coupler used to connect the first and second pipe ends. In particular, when the first and second pipe ends are aligned in proximity in step 435, the fitting may attach to the end of a pipe segment via circumferential grooves at the end of the pipe to be joined. Examples of such pipe fittings used with the pipe alignment tool 100 may include: service saddles, repair clamps, grooved clamps, and flange connections. Any connecting piece requiring clearance during installation around the pipe may also be used in conjunction with the pipe fittings.

Figure 5:
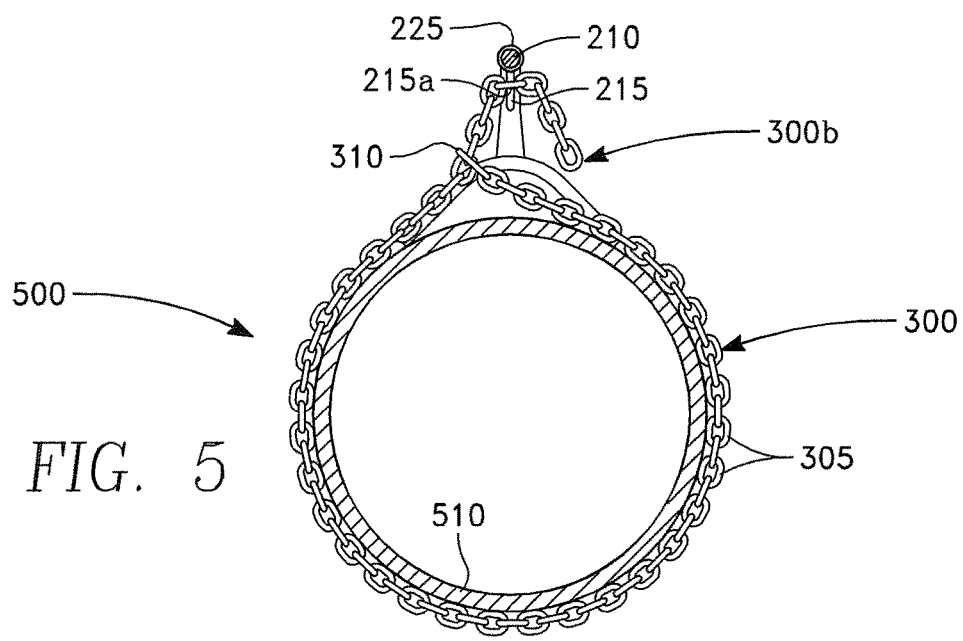
FIG. 5 is an illustration of a cross section view of a pipe being lassoed by the pipe alignment tool, according to various embodiments of the present disclosure.

FIG. 5 is an illustration of a cross section view of a pipe being lassoed by the pipe alignment tool, according to various embodiments of the present disclosure. As shown in FIG. 5, the second end 300b of the chain 300 may be inserted through the opening 310a of the ring 310 to create a lasso 500, and the lasso 500 may be used to hold and secure a section of a pipe 510 via a noose. This may be accomplished by wrapping the chain 300 around the pipe 510 and then feeding the second end 300b of the chain 300 and some chain links 305 through the ring 310 located at the first end 300a of the chain 300. The second end 300b of the chain 300 may then be fed through the guide ring segment 220, pulled tight, and hooked into the receiving slot 215a of the grab hook portion 215, as shown in FIG. 5. In this manner, the alignment bar 200 may hold and support the chain 300 and pipe 510 via the chain support 205 in order for the pipe 510 to be aligned and manipulated, so that the pipe coupling may be secured.

Figure 6:
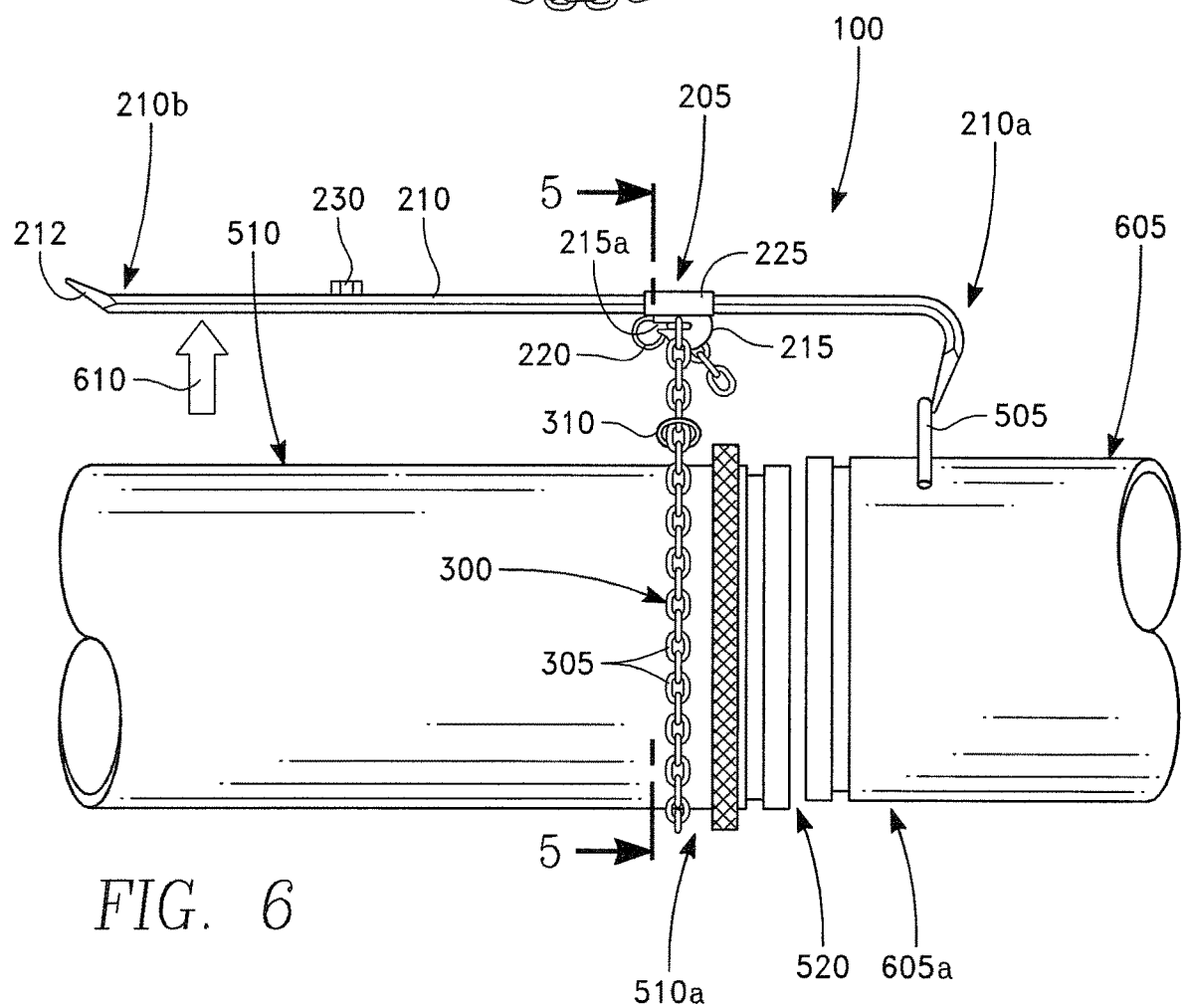
FIG. 6 is an illustration of the pipe alignment tool and shows the pipe alignment tool aligning and joining two pipe ends, according to various embodiments of the present disclosure.

FIG. 6 is an illustration of the pipe alignment tool and shows the pipe alignment tool aligning and joining two pipe ends, according to various embodiments of the present disclosure. As shown in FIG. 6, the first pipe end 510a may be aligned and joined by a second pipe end 605a via the pipe alignment tool 100. Here, once the first pipe 510 and the second pipe 605 are aligned, the pipe contacting member 505 of the pipe alignment tool 100 may contact and engage the second pipe 515. Once the pipe contacting member 505 is engaged with the second pipe 515, an upward force 610 may be applied beneath the rearwardly-extending free end portion 210b of the elongate bar 210. In this manner, the chain support 205 may serve as a fulcrum for leverage, causing the first pipe end 510a and second pipe end 605a to be in near proximity or in an end-to-end abutting relation. As a result, a pipe fitting 520 or clamp may be used to join the first and second pipes.

The foregoing descriptions of the embodiments of the pipe alignment tool and method have been presented for the purposes of illustration and description. While multiple embodiments of the pipe alignment tool and method are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the pipe alignment tool and method are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A pipe alignment tool, comprising:
    a chain having a plurality of chain links interconnected in series and a ring coupled to a first end of said chain, said ring having an opening sized to allow a second end of said chain and said plurality of chain links to pass through; and
    an alignment bar, comprising:
        a chain support adapted to guide and retain said chain, said chain support comprising:
            a grab hook portion having a receiving slot with an open side;
            a guide ring segment closing said open side of said grab hook portion; and
            a sleeve portion combined with said grab hook portion and said guide ring segment; and
        an elongate bar extending about a longitudinal axis and having forwardly and rearwardly-extending free end portions, said forwardly-extending free end portion being curved downwards and comprising a pipe contacting member, and
        wherein said elongate bar is slidably disposed within a cavity of said sleeve portion.

2. The pipe alignment tool, according to claim 1, wherein said chain is adapted to lasso around a pipe having a bore diameter between approximately 4 to 16 inches by wrapping said plurality of chain links around said pipe and passing said second end of said plurality of chain links through said ring of said chain.

3. The pipe alignment tool, according to claim 1, wherein said elongate bar further comprises a protrusion disposed between said rearwardly-extending free end portion and said chain support, said protrusion being adapted to block said chain support from contacting said rearwardly-extending free end portion of said elongate bar.

4. The pipe alignment tool, according to claim 1, wherein said pipe contacting member of said elongate bar comprises two arm portions and is substantially v-shaped.

5. The pipe alignment tool, according to claim 1, wherein an end portion of said rearwardly-extending free end portion of said elongate bar is tilted at an angle upwards and away from said longitudinal axis.

6. A method for aligning two pipe ends, the method comprising the steps of:
   providing a pipe alignment tool, comprising:
      a chain having a plurality of chain links interconnected in series and a ring coupled to a first end of said chain, said ring having an opening sized to allow a second end of said chain and said plurality of chain links to pass through; and
      an alignment bar, comprising:
         a chain support adapted to guide and retain said chain, said chain support comprising a combination of: a grab hook portion, a guide ring segment, and a sleeve portion; and
         an elongate bar extending about a longitudinal axis and slidably disposed within a cavity of said sleeve portion of said chain support;
         wherein said elongate bar comprises: a forwardly-extending free end portion, a rearwardly-extending free end portion, and a protrusion disposed between said rearwardly-extending free end portion and said chain support, said forwardly-extending free end portion being curved downwards and comprising a pipe contacting member;
   lassoing said chain around a first pipe by wrapping said chain around said first pipe and passing said second end of said chain and at least some of said plurality of chain links through said ring, such that said chain nooses said first pipe;
   engaging and securing said chain to said chain support of said pipe alignment tool by at least feeding said second end of said chain through said guide ring segment of said chain support and sliding one of said plurality of chain links through said receiving slot of said grab hook portion;
   hoisting said chain and said first pipe with said pipe alignment tool by lifting said alignment bar; and
   aligning a first pipe end of said first pipe with a second pipe end by repositioning said alignment bar and engaging said pipe contacting member with an upper portion of said second pipe.

7. The method according to claim 6, further comprising the step of:
   applying an upward force beneath said rearwardly-extending free end portion of said elongate bar, such that said chain support serves as a fulcrum for leverage, said upward force causing said first and second pipe ends to become end-to-end abutting relation.

8. The method according to claim 7, wherein said first and second pipes have bore diameters between approximately 4 to 16 inches.

9. The method according to claim 8, further comprising the steps of:
   providing a lifting apparatus;
   repositioning said lifting apparatus beneath said first pipe or said second pipe; and
   lifting said first pipe or said second pipe with said lifting apparatus.

10. The method according to claim 9, wherein said lifting mechanism is a scissor-jack.

11. The pipe alignment tool, according to claim 6, wherein said pipe contacting member of said elongate bar comprises two arm portions and is substantially v-shaped.

12. The pipe alignment tool, according to claim 6, wherein an end portion of said rearwardly-extending free end portion of said elongate bar is tilted at an angle upwards and away from said longitudinal axis.

13. A method for aligning and joining two pipe ends, the method comprising the steps of:
   providing a pipe alignment tool, comprising:
      a chain having a plurality of chain links interconnected in series and a ring coupled to a first end of said chain, said ring having an opening sized to allow a second end of said chain and said plurality of chain links to pass through; and
      an alignment bar, comprising:
         a chain support adapted to guide and retain said chain, said chain support comprising:
            a grab hook portion having a receiving slot sized to substantially fit a thickness of at least one of said plurality of chain links, wherein said receiving slot has an open side;
            a guide ring segment closing said open side of said grab hook portion; and
            a sleeve portion combined with said grab hook portion and said guide ring segment; and
         an elongate bar extending about a longitudinal axis in length between approximately 30 to 55 inches and slidably disposed within a cavity of said sleeve portion;
         wherein said elongate bar comprises: a forwardly-extending free end portion, a rearwardly-extending free end portion, and a protrusion disposed between said rearwardly-extending free end portion and said chain support, said forwardly-extending free end portion being curved downwards and comprising a pipe contacting member;
   lassoing said chain around a first pipe by wrapping said chain around said first pipe and passing said second end of said chain and at least some of said plurality of chain links through said ring, such that said chain nooses said first pipe;
   engaging and securing said chain to said chain support of said pipe alignment tool by passing at least said second end of said chain through said guide ring segment of said chain support and sliding one of said plurality of chain links through said receiving slot of said grab hook portion;
   hoisting said chain and said first pipe with said pipe alignment tool by lifting said alignment bar;
   aligning a first pipe end with a second pipe end by repositioning said alignment bar and engaging said pipe contacting member with an upper portion of said second pipe; and
   wherein said first and second pipe ends have bore diameters between approximately 4 to 16 inches.

14. The method according to claim 13, further comprising the step of:
   applying an upward force beneath said rearwardly-extending free end portion of said elongate bar, such that said chain support serves as a fulcrum for leverage, said upward force causing said first and second pipe ends to become end-to-end abutting relation.

15. The method according to claim 14, further comprising the steps of:
   providing a lifting apparatus;
   repositioning said lifting apparatus beneath said first pipe or said second pipe; and
   lifting said first pipe or said second pipe with said lifting apparatus.

16. The method according to claim 15, wherein said lifting mechanism is a scissor-jack.

17. The method according to claim 14, further comprising the step of:
   joining said first and second pipes by installing a grooved clamp around said first pipe end and said second pipe end.

18. The method according to claim 14, further comprising the step of:
   joining said first and second pipes by installing a pipe fitting between said first pipe end and said second pipe end.

19. The pipe alignment tool, according to claim 14, wherein said pipe contacting member of said elongate bar consists two arm portions and is substantially v-shaped.

20. The pipe alignment tool, according to claim 14, wherein an end portion of said rearwardly-extending free end portion of said elongate bar is tilted at an angle upwards and away from said longitudinal axis.

* * * * *